G. M. HOWARD.
NEGATIVE POLE PLATE.
APPLICATION FILED FEB. 17, 1908.

1,034,797.

Patented Aug. 6, 1912.

WITNESSES:
Rob R Kitchel
Frank C. French

INVENTOR
George M. Howard
BY
Augustus B Stoughton
ATTORNEY.

UNITED STATES PATENT OFFICE.

GEORGE M. HOWARD, OF PHILADELPHIA, PENNSYLVANIA.

NEGATIVE-POLE PLATE.

1,034,797.

Specification of Letters Patent.

Patented Aug. 6, 1912.

Application filed February 17, 1908. Serial No. 416,241.

*To all whom it may concern:*

Be it known that I, GEORGE M. HOWARD, a citizen of the United States, residing at the city of Philadelphia, in the county of Philadelphia and State of Pennsylvania, have invented certain new and useful Improvements in Negative-Pole Plates, of which the following is a specification.

The present invention relates to negative pole plates of the so-called box type, that is, negative pole plates provided with receptacles containing the active material or material to become active which, in use, is permitted or induced to assume a loose structure and which is held in the receptacles by covers having openings for the passage of the electrolyte, and the principal object of the invention is to improve the covers so as to prevent the escape from the receptacles of loose active material while affording free access of the electrolyte to the active material or material to become active. This object is accomplished by providing the covers with slits as distinguished from cuts or perforations in the making of which some of the material is removed.

The type of box plate chosen for illustration is illustrated in the accompanying drawings in which—

Figure 1:
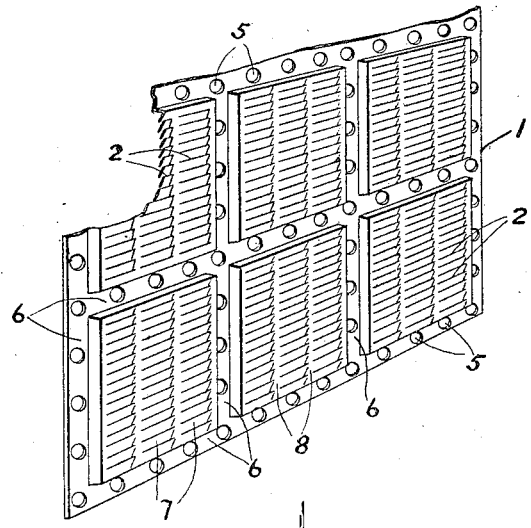
Figure 2:
Figure 3:
Figure 4:
Figure 6:
Figure 5:
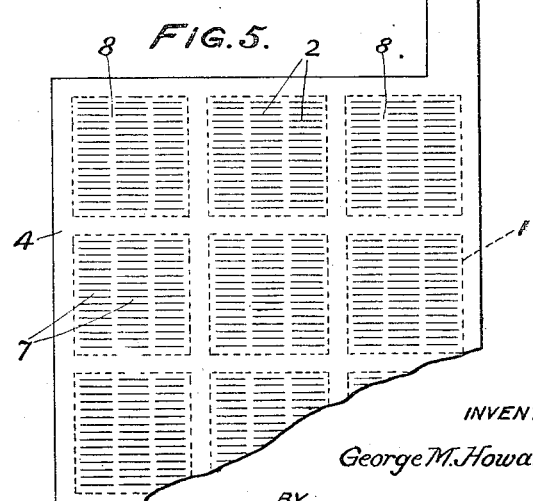

Figure 1, is a perspective view illustrating a cover embodying features of the invention. Figs. 2, 3 and 4, are views diagrammatically illustrating cross-sections of the cover shown in Fig. 1, and of two other covers embodying modifications of the invention, and Figs. 5 and 6, are respectively a side view and a cross-sectional view of a plate embodying features of the invention.

In the drawings, 1 is the cover and it is provided with slits 2, where it overlies the active material or material to become active 3. The slits 2, are cuts in the making of which no material is removed. The portions of the cover between the slits may be inclined in parallelism with each other as shown in Fig. 2, or may be staggered as shown in Fig. 3, or may be inclined in opposite directions as shown in Fig. 4. By the arrangement shown in Fig. 2, the result is to perhaps retain the loose active material rather better than in the other figures, but the point is that the slits, forming as they do very minute openings, operate, while affording access to the electrolyte, to retain the loose material, so that it is not washed out or permitted to escape from the pockets. The covers consist of thin sheets as of lead or lead alloy. In the plate chosen for illustration, 4 is the frame or grid which is cast to the covers in such a way that the latter are secured to its opposite faces. The metal of the plate running through the openings 5, and filling the channels 6, serves to secure the covers in place, but this is not a part of the invention which is, as has been said, directed to the slit-like openings in the covers through which loose material may not escape. The slits are shown as arranged in rows 7, with solid portions 8, between them.

What I claim is:

1. A negative pole plate grid having receptacles provided with covers consisting of sheets having parallel slits with the edges of the portions between the slits offset with respect to each other.

2. A negative pole plate grid provided with receptacles having covers comprising conducting sheets having rows of slits with the imperforate portions between the slits offset.

3. A negative pole plate grid having receptacles provided with covers consisting of sheets having parallel slits with the portions between the slits offset with respect to each other.

In testimony whereof I have hereunto signed my name.

GEORGE M. HOWARD.

Witnesses:
 BRUCE FORD,
 LEONARD H. WORNE.